US011531720B1

(12) United States Patent
Roman et al.

(10) Patent No.: US 11,531,720 B1
(45) Date of Patent: Dec. 20, 2022

(54) SYSTEM AND METHOD FOR TRANSFORMING SOURCE-DEPENDENT DATA INTO SOURCE-AGNOSTIC DATA

(71) Applicant: AD IT UP, INC., Chicago, IL (US)

(72) Inventors: Jordan Roman, Chicago, IL (US); Anthony Gaples, Chicago, IL (US)

(73) Assignee: AD IT UP, INC., Chicago, IL (US)

( * ) Notice: Subject to any disclaimer, the term of this patent is extended or adjusted under 35 U.S.C. 154(b) by 0 days.

(21) Appl. No.: 17/111,166

(22) Filed: Dec. 3, 2020

Related U.S. Application Data

(60) Provisional application No. 62/943,373, filed on Dec. 4, 2019.

(51) Int. Cl.
| | |
|---|---|
| *G06F 16/955* | (2019.01) |
| *G06F 16/901* | (2019.01) |
| *G06F 16/9038* | (2019.01) |
| *G06F 16/9035* | (2019.01) |

(52) U.S. Cl.
CPC ...... *G06F 16/9566* (2019.01); *G06F 16/9024* (2019.01); *G06F 16/9035* (2019.01); *G06F 16/9038* (2019.01)

(58) Field of Classification Search
CPC .............. G06F 16/972; G06F 16/9566; G06F 16/9038; G06F 16/9035; G06F 16/9024
See application file for complete search history.

(56) References Cited

U.S. PATENT DOCUMENTS

| | | | |
|---|---|---|---|
| 10,559,009 B1* | 2/2020 | Kingman, Jr. | G06Q 30/0269 |
| 2002/0124005 A1* | 9/2002 | Matson | G06Q 30/06 |
| 2008/0027957 A1* | 1/2008 | Bruckner | G06F 16/244 |
| 2016/0275173 A1* | 9/2016 | Gomes | G06F 16/285 |
| 2017/0177626 A1* | 6/2017 | Dupey | G06F 16/215 |

\* cited by examiner

*Primary Examiner* — Taelor Kim
(74) *Attorney, Agent, or Firm* — Foley & Lardner LLP

(57) ABSTRACT

A system and method to convert source dependent data into source-agnostic data includes extracting, by a processing unit associated with a data transformation application, relevant data from impression data received from a data source to obtain extracted data, cleansing the extracted data for obtaining cleansed data, and converting the cleansed data into source-agnostic data by re-categorizing at least some of the cleansed data. The system and method also include retrievably storing the source-agnostic data as persisted data into a memory associated with the data transformation application, receiving a query via a dashboard associated with the data transformation application to retrieve the persisted data, and displaying a portion of the persisted data that satisfies the query on the dashboard.

20 Claims, 13 Drawing Sheets

| SITE | IMPRESSIONS | CPM | CATEGORY | PLACEMENT |
|---|---|---|---|---|
| princesspinkygirl.com | 1636768 | $13.51 | N | 160 x 600 |
| littlebinsforlittlehands.com | 692051 | $9.01 | H | 160 x 600 |
| motherboard.vice.com | 1065575 | $6.03 | B | 160 x 600 |
| www.hyperactivz.com | 1624785 | $12.19 | M | 160 x 600 |
| www.coloradoan.com | 2261730 | $2.60 | S | 160 x 600 |
| worldfishingnetwork.com | 1181708 | $8.36 | B | 160 x 600 |
| un.org | 1950332 | $4.32 | B | 160 x 600 |
| www.arcamax.com | 1101838 | $9.99 | P | 160 x 600 |
| nesn.com | 711136 | $10.52 | P | 160 x 600 |
| www.dadsworksheets.com | 1164728 | $6.17 | N | 160 x 600 |
| consumable.com | 980562 | $10.90 | S | 160 x 600 |
| mobymax.com | 2049648 | $6.32 | F | 160 x 600 |
| github.com | 2255076 | $8.74 | S | 160 x 600 |
| www.skiptomylou.org | 2186747 | $11.95 | C | 160 x 600 |
| thisoutnumberedmama.com | 1269014 | $11.27 | B | 160 x 600 |
| totallychaos.com | 94865 | $4.71 | B | 160 x 600 |
| wwe.chewoutloud.com | 1660559 | $8.75 | E | 160 x 600 |
| xing.com | 1457446 | $7.41 | B | 160 x 600 |
| pickthebrain.com | 363070 | $13.52 | S | 160 x 600 |
| theglobeandmail.com | 1661407 | $4.76 | G | 160 x 600 |
| www.daily-times.com | 1867788 | $14.05 | N | 160 x 600 |

| CATEGORY KEY | SYMBOL |
|---|---|
| SPORTS | S |
| NEWS | N |
| GAMING | G |
| FINANCE | F |
| BUSINESS | B |
| POLITICS | P |
| BLOG | B |
| UNKNOWN | U |
| FITNESS | FIT |
| MEDICAL | M |
| HOUSING | H |
| CONSTRUCTION | C |
| EDUCATION | E |
| WEATHER | W |

FIG. 4

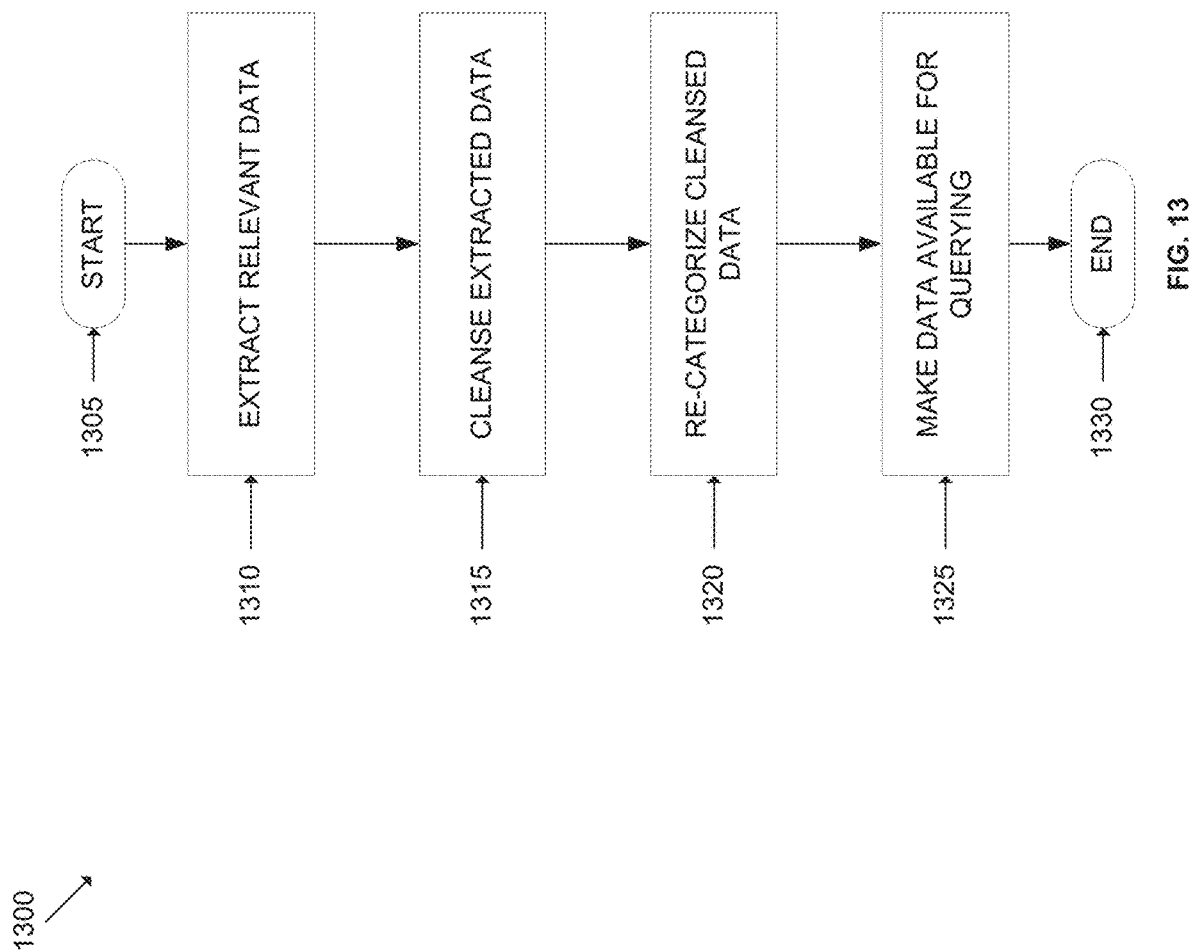

SYSTEM AND METHOD FOR TRANSFORMING SOURCE-DEPENDENT DATA INTO SOURCE-AGNOSTIC DATA

PRIORITY STATEMENT

This application claims the benefit of U.S. Provisional Patent Application No. 62/943,373, filed Dec. 4, 2019, the entirety of which is hereby incorporated by reference herein.

BACKGROUND

Applicant provides the following description to assist the understanding of the reader. None of the information provided or references cited is admitted to be prior art.

Many applications perform data analysis to make informed decisions. Data that is used during data analysis may be provided from any of a variety of sources. Based upon the source from which the data is obtained, the format and the quality of data may vary, which may impact the accuracy and efficacy of data analysis.

SUMMARY

The systems, methods, and devices of this disclosure each have several innovative aspects, no single one of which is solely responsible for all of the desirable attributes disclosed herein.

Various aspects of the disclosure will now be described with regard to certain examples and embodiments, which are intended to illustrate but not limit the disclosure. Although the examples and embodiments described herein will focus on, for the purpose of illustration, specific systems and processes, one of skill in the art will appreciate the examples are illustrative only, and are not intended to be limiting.

In accordance with some aspects of the present disclosure, a method is disclosed. The method includes extracting, by a processing unit associated with a data transformation application, relevant data from impression data received from a data source for obtaining extracted data, cleansing, by the processing unit, the extracted data for obtaining cleansed data, and converting, by the processing unit, the cleansed data into source-agnostic data by re-categorizing at least some of the cleansed data. The method also includes retrievably storing, by the processing unit, the source-agnostic data as persisted data into a memory associated with the data transformation application, receiving, by the processing unit, a query via a dashboard associated with the data transformation application to retrieve the persisted data, and displaying, by the processing unit, a portion of the persisted data that satisfies the query on the dashboard.

In accordance with yet other aspects of the present disclosure, a non-transitory computer-readable medium having computer-readable instructions retrievably stored thereon is disclosed. The computer-readable instructions when executed by a processing unit associated with a data transformation application causes the processing unit to extract relevant data from impression data received from a data source to obtain extracted data, cleanse the extracted data to obtain cleansed data, and convert the cleansed data into source-agnostic data by re-categorizing at least some of the cleansed data. The computer-readable instructions also cause the processing unit to retrievably store the source-agnostic data as persisted data into a memory associated with the data transformation application, receive a query via a dashboard associated with the data transformation application to retrieve the persisted data, and display a portion of the persisted data that satisfies the query on the dashboard.

In accordance with some other aspects of the present disclosure, a system is disclosed. The system includes a data transformation application having a repository and a processing unit to extract relevant data from impression data received from a data source to obtain extracted data, cleanse the extracted data to obtain cleansed data, convert the cleansed data into source-agnostic data by re-categorizing at least some of the cleansed data, and retrievably store the source-agnostic data as persisted data into the repository. The system also includes a dashboard to receive a query to retrieve the persisted data and display a portion of the persisted data that satisfies the query.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 4 is an example of persisted data that is generated by the data transformation application of FIG. 2, in accordance with some embodiments of the present disclosure.

FIG. 13 is an example flowchart outlining operations implemented by the data transformation application of FIG. 2 to obtain the persisted data and make that data available for display on the dashboard, in accordance with some embodiments of the present disclosure.

Figure 1:
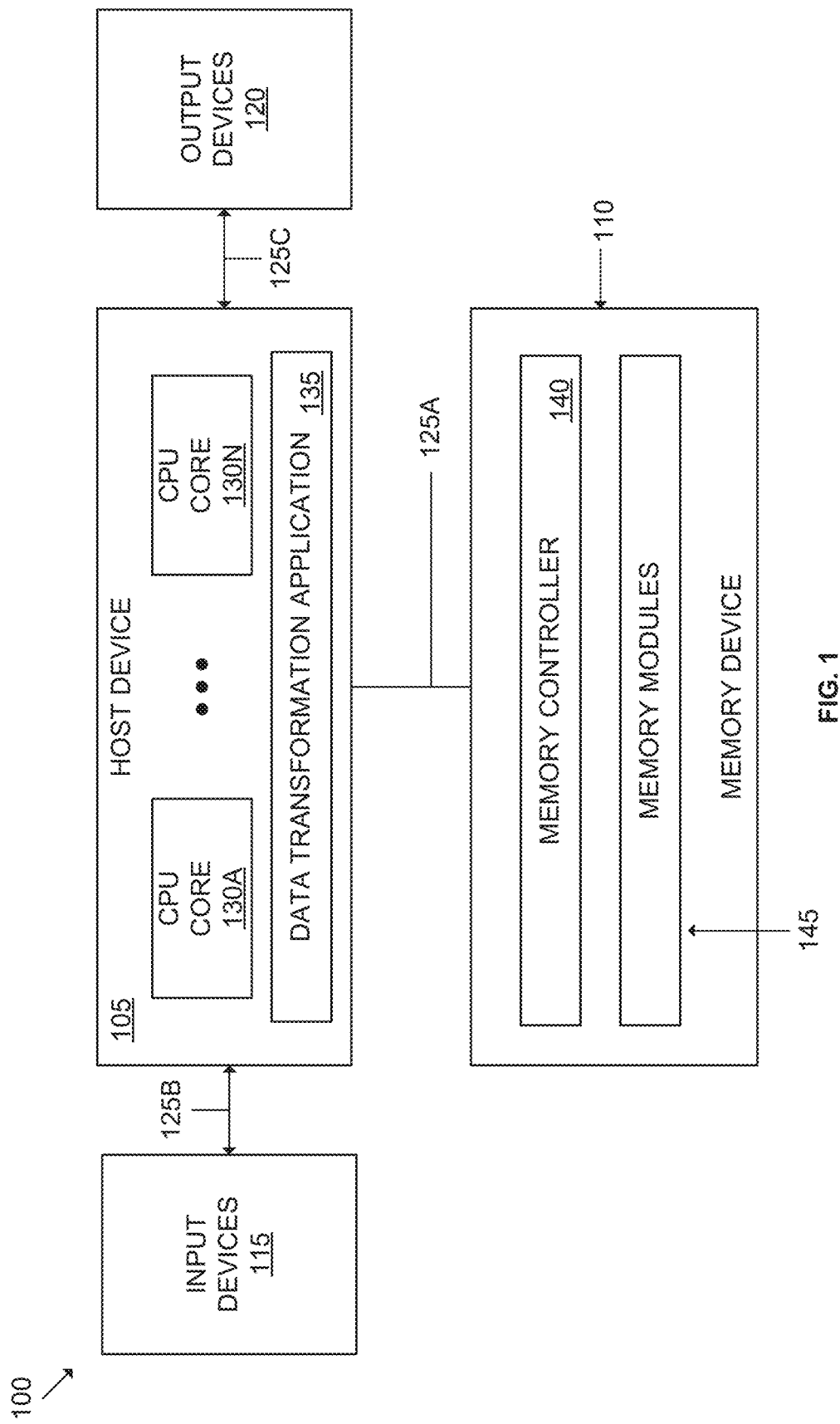
FIG. 1 is an example block diagram of a computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is directed to converting source-dependent data into source-agnostic data. A data transformation application receives source-dependent data from a plurality of data sources, and converts that data into source-agnostic data. As used herein, source-dependent data means that the format of the data and the types of data attributes associated with the data are dependent upon the data source that provides the data, and the format of the data and the data attributes may vary from one data source to another. Source-agnostic data means that the format and data attributes of the data are not dependent upon any data source.

In online advertising, demand side platforms and supply side platforms are data content providers that create and supply content (e.g., advertisements) to a variety of platforms (e.g., websites). These data content providers also collect usage data pertaining to the supplied content (e.g., advertisements) from these platforms. For example, the data content providers may collect usage data regarding the number of users to which the content has been exposed, the cost/revenue associated with the content, the device on which the content is made available, etc. These data content providers may then make the usage data available to media buyers who may be interested in buying that content from the data content providers. Since media buyers may receive usage data from various data content providers, the media buyers need to consolidate data received from these differing data content providers to compare the content and the data content providers. For example, the media buyers may compare the usage data received from various data content providers to determine which data content provider offers the best price for the content, which data content provider's content has the widest reach (e.g., is exposed to most users), etc.

However, since the usage data from the different data content providers may be in different formats and may contain varying data attributes, the data from these differing data content providers is not easily consolidated. Even when consolidated, due to the varying formats and data attributes, the consolidated data does not provide a consistent and accurate view of the data. The data transformation application of the present disclosure consolidates and harmonizes the format and data attributes of data received from various data content providers to enable easy and accurate comparison. Thus, the data transformation application receives the usage data collected by these data content providers, and converts that usage data into source-agnostic data that is not dependent upon the data content provider that supplied the usage data. The data transformation application also makes the source-agnostic data available to users (e.g., media buyers) to query via a dashboard.

To convert the usage data into source-agnostic data, the data transformation application re-categorizes the usage data. Specifically, each data content provider may assign a category to each platform from which that data content provider collects usage data from. In some embodiments, the category that a data content provider assigns to a particular platform may be based upon the type of content that is displayed on the platform. Since multiple data content providers may be collecting usage data from a particular platform, each data content provider may assign a category to that platform, and the categories assigned to the platform by the different data content providers may vary. For example, a first data content provider may assign a category of "news" to Website A, while a second data content provider may assign a category of "sports" to Website A. Thus, Website A may be assigned differing categories. When a media buyer receives the usage data associated with Website A from the first data content provider and the second data content provider, the media buyer may be unable to properly compare the usage data received from the first and the second data content providers due to the differing categories.

For example, if the media buyer is interested in reviewing usage data related to platforms that provide "news" related content, the media buyer may disregard the usage data pertaining to Website A received from the second data content provider since that data content provider categorized Website A as a "sports" website. Thus, the media buyer does not get an accurate view of the usage data received from the various data content providers. The data transformation application of the present disclosure remediates this problem by re-categorizing a platform such that a particular platform is assigned the same category across various data content providers. Specifically, in some embodiments, the data transformation application maintains a running list in which each platform whose data is received by the data transformation application is assigned a category. The category that the data transformation application assigns to a particular platform may be same as or different from the category that a given data content provider may have assigned to the particular platform. Thus, when the data transformation application receives the usage data of a particular platform, the data transformation application may determine if the data transformation application had previously assigned a category to that platform. For example, the data transformation application may cross-reference the name of the platform with the running list to check if the particular platform is on the running list. If the data transformation application determines that the particular platform was categorized previously (e.g., the platform is on the running list), the data transformation application may assign the same category to the particular platform that is listed on the running list for that platform regardless of the category assigned to the particular platform by the data content provider.

For example and continuing with the example above, if the data transformation application receives the usage data of Website A from the first data content provider and the second data content provider that have assigned Website A categories of "news" and "sports," respectively, the data transformation application may first determine if Website A was previously categorized by the data transformation application (e.g., whether Website A is on the running list). If the data transformation application determines that Website A was previously categorized, the data transformation application may assign the same category to Website A as that indicated on the running list. For example, if the data transformation application previously assigned a category of "finance" to Website A, the data transformation application may assign the category of "finance" to Website A even though the first and second data content providers assigned different categories to Website A.

If the data transformation application determines that a particular platform is a new platform (e.g., has not been previously categorized by the data transformation application, and is thus not on the running list), the data transformation application may assign a category to that platform. The data transformation application may use a variety of criteria to determine the correct category for a particular platform. For example, in some embodiments, the data transformation application may assign a category that is most commonly assigned to a particular platform by data content providers. In some embodiments, the data transformation application may keep track of each category that has been assigned to a particular platform by the various data content providers. If a particular category is assigned greater than a threshold number of times, the data transformation application may assign that category to the particular platform. In other embodiments, the data transformation application may use other designated criteria. Upon categorizing the particular platform, the data transformation application adds that platform and the category assigned to that platform on the running list for future categorizations. Thus, each platform is uniformly assigned the same category each time usage data pertaining to that platform is received.

Thus, the data transformation application provides for aggregation, analysis, presentation of data for digital media and other commodities. For media buyers, the source-agnostic data provides the ability to conveniently and easily view data from multiple data content providers in one place. The media buyers may use the source-agnostic data to improve their purchasing/forecasting decisions and benchmark themselves. In some embodiments, the data transformation application may be designed to display pricing or cost per thousand impression data to the users. In other embodiments, the data transformation application may be designed to display other types of data. For advertisement sellers such as demand side platforms and supply side platforms, by seeing data from multiple sources in one convenient location, they can price review/compete/build campaigns to attract media buyers searching for execution price history.

Therefore, the data transformation application creates transparency in price for paid advertisement space for both, media buyers and data content providers. The data transformation application also provides a tool, via the dashboard, to evaluate or compare data from multiple data content providers. The dashboard provides a third party agnostic tool for end clients to form an opinion or a conclusion from selected source-agnostic data. Although the present disclosure has been discussed in terms of online advertising, it is to be understood that the present disclosure may be applied to any application in which data from multiple sources is to be combined together for data analysis.

Referring now to FIG. 1, an example block diagram of a computing system 100 is shown, in accordance with some embodiments of the disclosure. The computing system 100 includes a host device 105 associated with a memory device 110. The host device 105 may be configured to receive input from one or more input devices 115 and provide output to one or more output devices 120. The host device 105 may be configured to communicate with the memory device 110, the input devices 115, and the output devices 120 via appropriate interfaces or channels 125A, 125B, and 125C, respectively. The computing system 100 may be implemented in a variety of computing devices such as computers (e.g., desktop, laptop, etc.), tablets, personal digital assistants, mobile devices, wearable computing devices such as smart watches, other handheld or portable devices, or any other computing unit suitable for performing operations described herein using the host device 105.

The input devices 115 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 105 and that allows an external source, such as a user, to enter information (e.g., data) into the host device and send instructions to the host device. Similarly, the output devices 120 may include a variety of output technologies such as external memories, printers, speakers, displays, microphones, light emitting diodes, headphones, plotters, speech generating devices, video devices, global positioning systems, and any other output peripherals that are configured to receive information (e.g., data) from the host device 105. The "data" that is either input into the host device 105 and/or output from the host device may include any of a variety of textual data, graphical data, video data, sound data, position data, combinations thereof, or other types of analog and/or digital data that is suitable for processing using the computing system 100.

The host device 105 may include one or more Central Processing Unit ("CPU") cores or processors 130A-130N that may be configured to execute instructions for running one or more applications associated with the host device. In some embodiments, the instructions and data needed to run the one or more applications may be retrievably stored within the memory device 110. The host device 105 may also be configured to retrievably store the results of running the one or more applications within the memory device 110. One such application on the host device 105 may include a data transformation application 135. The data transformation application 135 may be executed by one or more of the CPU cores 130A-130N. The instructions to execute the data transformation application 135 may be retrievably stored within the memory device 110. The data transformation application 135 is described in greater detail below. Thus, the host device 105 may be configured to request the memory device 110 to perform a variety of operations. For example, the host device 105 may request the memory device 110 to read data, write data, update or delete data, and/or perform management or other operations.

To facilitate communication with the memory device 110, the memory device 110 may include or be associated with a memory controller 140. Although the memory controller 140 is shown as being part of the memory device 110, in some embodiments, the memory controller may instead be part of the host device 105 or another element of the computing system 100 and operatively associated with the memory device. The memory controller 140 may be configured as a logical block or circuitry that receives instructions from the host device 105 and performs operations in accordance with those instructions. For example, when the execution of the data transformation application 135 is desired, the host device 105 may send a request to the memory controller 140. The memory controller 140 may read the instructions associated with the data transformation application 135 that are retrievably stored within the memory device 110, and send those instructions back to the host device. In some embodiments, those instructions may be temporarily retrievably stored within a memory on the host device 105. One or more of the CPU cores 130A-130N may then execute those instructions by performing one or more operations called for by those instructions of the data transformation application 135.

The memory device 110 may include one or more memory modules 145 that retrievably store data and instructions. The memory modules 145 may be any of a variety of memory types, including a variety of volatile memories, non-volatile memories, or a combination thereof. For example, in some embodiments, one or more of the memory modules 145 or portions thereof may include NAND flash memory cores. In other embodiments, one or more of the memory modules 145 or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the memory device 110. In some embodiments, one or more of the memory modules 145 or portions thereof may be configured as other types of retrievable storage class memory ("SCM"). Generally speaking, the memory modules 145 may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

It is to be understood that only some components of the computing system 100 are shown and described in FIG. 1. However, the computing system 100 may include other components such as various batteries and power sources, networking interfaces, routers, switches, external memory systems, controllers, etc. Generally speaking, the computing system 100 may include any of a variety of hardware, software, and/or firmware components that are needed or considered desirable in performing the functions described herein. Similarly, the host device 105, the input devices 115, the output devices 120, and the memory device 110 including the memory controller 140 and the memory modules 145, may include hardware, software, and/or firmware components that are considered necessary or desirable in performing the functions described herein. In addition, in certain embodiments, the memory device 110 may integrate some or all of the components of the host device 105, including, for example, the CPU cores 130A-130N, and the CPU cores may be configured to execute the data transformation application 135, as described herein.

Figure 2:
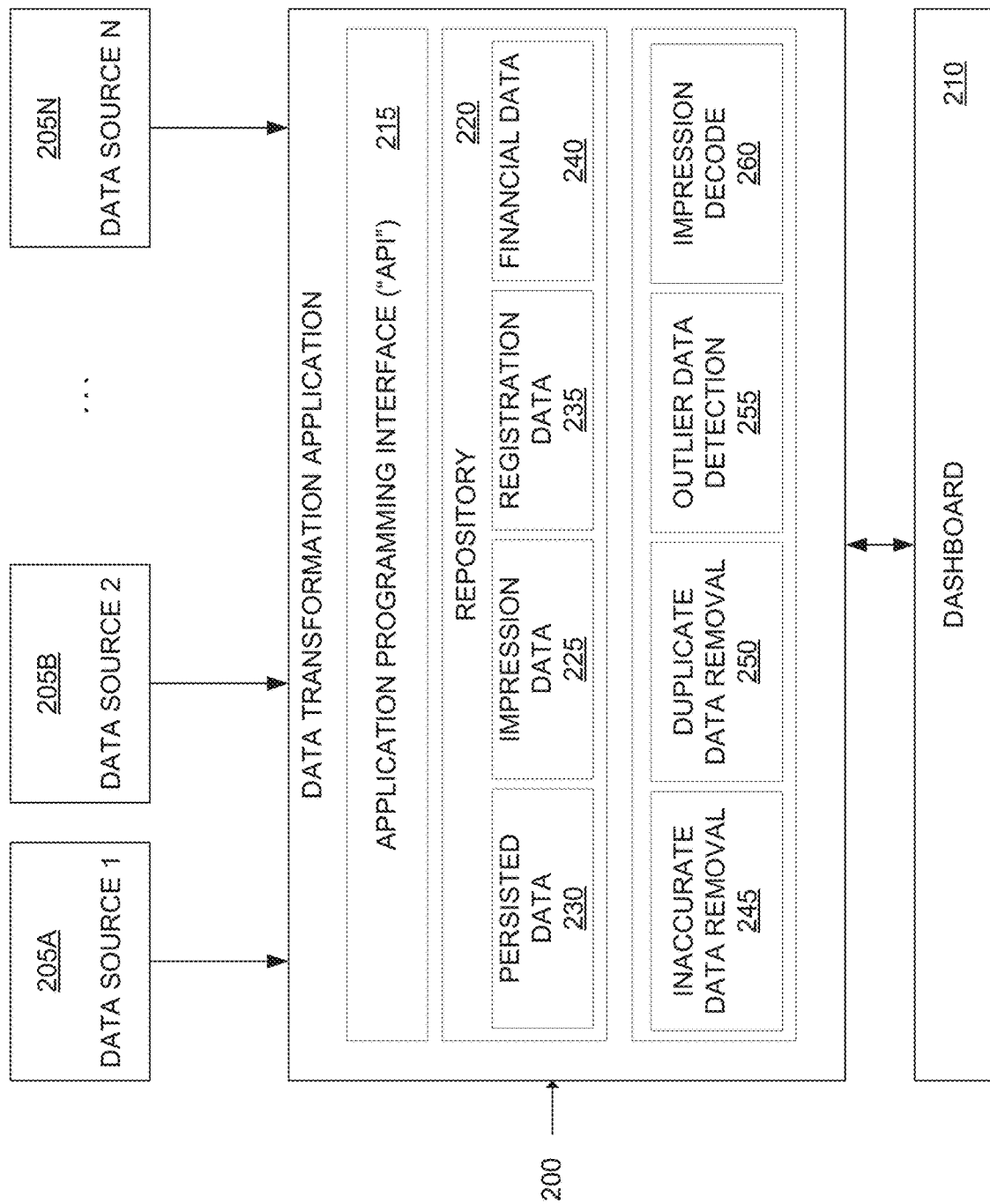
FIG. 2 is an example block diagram of a data transformation application of the computing system of FIG. 1, in accordance with some embodiments of the present disclosure.

Turning now to FIG. 2, a data transformation application 200 is shown, in accordance with some embodiments of the present disclosure. The data transformation application 200 is analogous to the data transformation application 135 discussed above. Thus, although not shown in FIG. 2, the data transformation application 200 is installed on a computing device (e.g., the host device 105) and is associated with one or more processing units (e.g., the CPU cores 130A-130N) to execute instructions retrievably stored on a memory device (e.g., the memory device 110). The data transformation application 200 may also be associated with other elements (whether software, hardware, firmware, or combinations thereof) to perform the operations described herein. The data transformation application 200 is configured to receive source-dependent data from one or more data sources 205A-205N, transform the source-dependent data into source-agnostic data, and make the source-agnostic data available to a user for querying via a dashboard 210.

The data sources 205A-205N may be any of a variety of data content providers that receive and compile data (e.g., usage data) from a variety of platforms, and make that data available to external entities. For example, in some embodiments, one or more of the data sources 205A-205N may be data content providers such as Google, Amazon, Microsoft, TradeDesk, Adobe, Rocket Fuel, Choozle, Media Math, Bright Roll, and App Nexus. In other embodiments, one or more of the data sources 205A-205N may be other data content providers. The data sources 205A-205N may gather data from a variety of platforms such as websites, applications, services, etc. For example, one of the data sources 205A-205N may be Google. A particular web site (e.g., a web browser used to access that website) may automatically share information (e.g., uniform resource locator, Internet Protocol address, type of device on which the website is accessed, etc.) with Google. For example, in some embodiments, the particular website may have an embedded advertisement, and the data received by Google from the particular website may include information pertaining to the advertisement (e.g., number of users who saw the advertisement, the revenue generated from the advertisement, etc.). Google may similarly receive information from other platforms. Google may gather all of the data received from all such platforms, and make the gathered data available to third parties (e.g., media buyers).

While the data sources 205A-2305N may gather information from a variety of platforms, for ease of explanation, the present disclosure is explained with respect to data gathered from a website platform. However, the present disclosure may be applied to data gathered from other platforms as well. Further, it is to be understood that Google is simply an example of one of the data sources 205A-205N, and is not intended to be limiting in any way. The data sources 205A-205N may be any of a variety of data content providers that gather data in some way from one or more platforms, and make that data available to third parties. Further, although at least three data sources have been shown in FIG. 2, the number of data sources may be fewer than three, or, as indicated with the $n^{th}$ data source designation, may be three or greater.

Additionally, the data transformation application 200 may implement or be associated with an Application Programming Interface ("API") 215 that may be configured to obtain the data from one or more of the data sources 205A-205N. In some embodiments, the API 215 may be configured to download the data from a server or designated location of each of the data sources 205A-205N. In other embodiments, the API 215 may use other ways to obtain the data from the data sources 205A-205N. In some embodiments, a single instance of the API 215 may be used to obtain the data from each of the data sources 205A-205N, while in other embodiments, more than one APIs may be used to obtain the data.

In other embodiments, the data transformation application 200 may use ways other than, or in addition to, the API 215 to obtain the data from the data sources 205A-205N. In some embodiments, the data transformation application 200 may receive the data directly from the data sources 205A-205N (e.g., direct download from the servers of the data sources), while in other embodiments, the data transformation application may obtain the data indirectly from the data sources. When the data is obtained indirectly, the data transformation application 200 may obtain the data from a third party that may in turn have obtained the data from the data sources 205A-205N. Thus, the data transformation application 200 may receive the data from the data sources 205A-205N in any of a variety of ways.

Further, the frequency with which the data transformation application 200 obtains the data from the data sources 205A-205N may vary from one embodiment to another. In some embodiments, the data transformation application 200 may obtain the data continuously or substantially continuously as the data becomes available at the data sources 205A-205N. In other embodiments, the data transformation application 200 may obtain the data periodically. For example, in some embodiments, the data transformation application 200 may be configured to receive the data once every day at a designated time (e.g., at midnight, etc.), once every hour, once every two days, or at other granularities as desired. The data that is received by the data transformation application 200 may be retrievably stored within a repository 220 associated with the data transformation application. In some embodiments, the repository 220 may be part of or associated with the memory device (e.g., the memory device 110) on which the instructions to execute the data transformation application 200 are retrievably stored. In other embodiments, the repository 200 may be another memory associated with the data transformation application 200.

Additionally, the most recent data received from the data sources 205A-205N may be referred to herein as impression data 225. Previously or historically received data from the data sources 205A-205N may be referred to herein as persisted data 230. Further, the impression data 225 is data that has not yet undergone data transformation, while the persisted data 230 is the data that has undergone data transformation. Thus, the impression data 225 upon undergoing data transformation may be retrievably stored as the persisted data 230. In some embodiments, the data transformation process may be performed on the impression data 225 as soon as that data is received from the data sources 205A-205N. In other embodiments, the data transformation process may be performed on the impression data 225 after a delay. For example, in some embodiments, the data transformation process may be performed at designated time intervals.

Further, the impression data 225 and the persisted data 230 may be retrievably stored within the repository 220 for a designated period of time before being deleted and/or replaced by new data. For example, in some embodiments, the impression data 225 may be retrievably stored until the impression data has undergone data transformation. Once the impression data 225 has been transformed and retrievably stored as the persisted data 230, the impression data may be deleted. In other embodiments, the impression data 225 may be retrievably stored for other periods of time. The persisted data 230 may also be retrievably stored for a designated period of time. For example, in some embodiments, the persisted data 230 may be retrievably stored for a few hours, days, weeks, months, or in other time granularities as desired.

In addition to retrievably storing the impression data 225 and the persisted data 230, the repository 220 may also retrievably store registration data 235 and financial data 240. The registration data 235 may be data associated with user accounts that are using the data transformation application 200. The financial data 240 may be billing data (e.g., credit card numbers, etc.) associated with those user accounts. In other embodiments, the repository 220 may be configured to retrievably store additional or other types of data associated with the data transformation application 200 as well.

As indicated above, the impression data 225 undergoes a data transformation process. The data transformation process includes a data cleansing process and a data categorization process. Specifically, the impression data 225 that is received from the data sources 205A-205N may be in varying formats, and may include varying types of information. Thus, the impression data 225 received from the data sources 205A-205N may be source-dependent data. The data transformation application 200 may convert the source-dependent data into source-agnostic data. Further, the impression data 225 may include a variety of non-relevant data. The data transformation application 200 may extract relevant data from the impression data 225, and ignore the remaining impression data. The portion of the impression data 225 that the data transformation application 200 extracts may be dependent upon the application in which the impression data is to be used. For example, if the impression data 225 is intended to provide cost and sale information about advertisements running on a particular platform, the data transformation application 200 may extract data from the impression data that provides cost and sale information.

Thus, for example, in some embodiments, in the advertising context, the data transformation application 200 may extract data related to the platform information, number of impressions, Cost Per Impression (CPM), category, and placement from the impression data 225. The platform information may identify the platform(s) from which the data sources 205A-205N receive data. In some embodiments, the platform information may include the URL of the platform(s) and/or other identifying information. The URL information may be parsed from the data in order to determine the platform. In some embodiments, the number of impressions means the number of times an online advertisement is fetched from its source regardless of whether the advertisement is actually viewed or clicked upon. In some embodiments, the term "impression" may be defined according to the definition provided by the Internet Architecture Board, which defines an impression as a measurement of responses from a web server to a page request from a user browser, and filtered from robotic activity and error codes, and recorded at a point as close as possible to opportunity to see the page by a user, also called a view. An online advertisement impression may be considered a single appearance of an advertisement on a web page. In some embodiments, the number of impressions may exclude certain non-qualifying activities such as robotic accesses, error codes, reload operations, etc.

The CPM defines the cost of one thousand impressions. In some embodiments, CPM may be determined by dividing the total cost of running an advertisement by the number of impressions by a thousand. Thus, CPM may be given by the following formula:

$$CPM = (\text{total cost of running an advertisement} * 1000) / \text{number of impressions}$$

Placement may be the size of an advertisement on a particular device on which the advertisement is displayed. Category may identify the type of information or content that a particular platform is configured to provide. For example, a website that primarily provides certain types of local and world news related content may be categorized as a news website. A website that primarily streams sporting events or provides sports related content may be considered a sports website. A website that primarily provides finance related content may be categorized as a finance website. Similarly, a website that primarily provides weather related content may be categorized as a weather website, and so on. Thus, based upon the content that a particular platform primarily provides, that platform may be categorized. In some embodiments, the data transformation application 200 may also extract device information on which the platform is accessed. For example, an advertisement may be displayed on a mobile phone, laptop, desktop, etc. The device information may identify which type of device the advertisement is displayed. The data transformation application 200 may extract other, additional, or different data from the gathered data in other embodiments.

The data transformation application 200 may cleanse the extracted data. To cleanse the extracted data, the data transformation application 200 may remove inaccurate and duplicate data. Specifically, in some embodiments, the impression data 225 may be organized in the form of rows and columns, with each row being directed to one particular advertisement on one particular platform, and each column being directed to one extracted data attribute (e.g., platform information, placement, device type, number of impressions, category, etc.). In some embodiments, the impression data 225 that is received from the data sources 205A-205N may already be organized into rows and columns. In other embodiments, the data transformation application 200 may organize the impression data 225 into rows and columns. For example, in an example scenario, the data may be received in a structured format (e.g., a JSON file or similar) that does not include rows and columns but rather includes a collection of data labels and values. The data labels may be parsed from the file, and each data label may be used to designate a new column. The values corresponding to the data labels may be parsed from the file and be used to populate the rows. To distinguish between the data labels and values, a first delimiter (e.g., a semicolon) may be parsed from the data. To distinguish among values in a multi-valued attribute, a second delimiter (e.g., a comma) may be parsed from the data. In some arrangements, a separate table is created for the multi-valued attributes.

Upon extracting the relevant data from the impression data 225, the data transformation application 200 may determine if certain data attributes or data entries are missing in the extracted data. For example, when the impression data 225 is organized into rows and columns, the data transformation application 200 may extract all rows and certain columns that have the relevant data attributes. If certain relevant columns that are to be extracted are either missing or the extracted columns have missing data values/entries, the data transformation application 200 may consider that data inaccurate.

Thus, the data transformation application 200 performs an inaccurate data removal 245. For data considered inaccurate, the data transformation application 200 may either request the data sources 205A-205N to send the missing data, or exclude the inaccurate data (e.g., by excluding the corresponding row) from the extracted data. In addition to the inaccurate data removal 245, the data transformation application 200 may perform a duplicate data removal 250. To perform the duplicate data removal 250, the data transformation application 200 may remove any duplicate data entries (e.g., rows) from the extracted data for each platform. Therefore, from the impression data 225, the data transformation application 200 extracts the relevant data, and performs the inaccurate data removal 245 and the duplicate data removal 250 on the extracted data. The extracted data from which inaccurate data and duplicate data has been removed is referred to herein as cleansed data.

The data transformation application 200 converts the cleansed data into source-agnostic data. Specifically, as discussed above, the data that is received from the data sources 205A-205N may have category as one of the data attributes. The category that is assigned to a particular platform may be determined based on the content that is provided on that platform. However, the platform may be providing multiple types of content. For example, a website may be providing both weather related information, as well as sports related information. Accordingly, a technical problem emerges of how to accurately identify and classify content types for various platforms. In operation, when more than one data source (e.g., the data sources 205A-205N) is gathering data from such a website, each data source may assign a different category to that particular website. Simply as an example and without intending to be limiting in any way, Google and Microsoft may collect data from Website A that provides both news and sports related information. Google may have categorized Website A as a news website, while Microsoft may have categorized Website A as a sports website. Thus, a discrepancy exists in the categorization of Website A. When the data transformation application 200 receives data pertaining to Website A from both Google and Microsoft, the data transformation application re-categorizes Website A such that both Google and Microsoft have the same category for Website A.

Specifically, the data transformation application 200 performs outlier data detection 255 during which the data transformation application 200 identifies discrepancies in category data received from various data sources (e.g., the data sources 205A-205N). In some embodiments, the data transformation application 200 may identify the discrepancies by first identifying the platforms whose data is received from multiple data sources. For example, if the cleansed data includes data related to Website A received from the data source 205A and the data source 205B, the data transformation application 200 may determine that a possibility of a discrepancy exists. The data transformation application 200 may compare the category provided by the data source 205A and the data source 205B for Website A. If the categories assigned to the Website A by the data source 205A and the data source 205B differ, the data transformation application 200 may determine that a discrepancy exists.

Additionally, the data transformation application 200 may determine if Website A was previously categorized by the data transformation application 200. Specifically, the data transformation application 200 may maintain a retrievably stored directory (e.g., a running list) that includes a list of all platforms that the data transformation application has previously categorized, and the category that the data transformation application has previously assigned to each of those platforms. In some arrangements, the directory may be stored in long-term non-transitory memory. In some arrangements, at least a portion of the directory (e.g., the platforms processed within a predetermined period of time, such as within 24 hours, 3 days, 7 days) can be stored in cache memory for easy retrieval. In some arrangements, the entries in the directory are indexed alphabetically (e.g., according to at least a segment of the parsed URL). In some arrangements, the entries on the list are indexed according to the amount of data (e.g., bytes, number of records, etc.) that was previously processed such that the high-volume platforms can be prioritized and the search execution time minimized. The data transformation application 200 may determine if Website A is on the running list. If the data transformation application 200 determines that Website A is on the running list, the data transformation application may determine that Website A was previously categorized. Additionally, if the data transformation application 200 determines that Website A is on the running list, the data transformation application may determine if the category assigned to Website A on the running list matches the category assigned to Website A by each of the data source 205A and the data source 205B that sent Website A's data to the data transformation application.

If the category assigned to Website A on the running list matches the category assigned to Website A by the data source 205A or the data source 205B, the data transformation application 200 may accept the category of the data source whose category matches that with the data transformation application 200. For example, if the category assigned by the data source 205A matches the category assigned previously by the data transformation application 200 to Website A, the data transformation application may accept the categorization. However, if the category assigned by the data source 205B does not match the category assigned previously to Website A by the data transformation application 200, the data transformation application may re-categorize the category assigned to Website A by the data source 205B.

Thus, the data transformation application 200 identifies discrepancies in the category of a particular platform and re-categorizes the platform. Specifically, upon identifying a discrepancy, the data transformation application 200 may perform an impression decode 260. During the impression decode 260, the data transformation application 200 may decide the appropriate category for a particular platform (e.g., Website A). For example, in some embodiments, if Website A is on the running list, the data transformation application 200 may assign the category that is assigned to Website A on the running list regardless of the category assigned to that website by the data source 205A or the data source 205B.

If Website A is not on the running list, the data transformation application 200 may designate a category to Website A, and add Website A and the designated category to the running list. In some embodiments, the data transformation application 200 may select the category assigned to Website A by the data source 205A or the category assigned to Website A by the data source 205B. In some embodiments, the data transformation application 200 may assign a different category to Website A than the ones assigned by the data sources 205A and 205B. In some embodiments, the data transformation application 200 may assign a category to Website A based upon the number of impressions. For example, in some embodiments, the data transformation application 200 may pick the category of the data source that has the highest number of impressions. For example, if the data source 205A has X number of impressions for Website A, while the data source 205B has Y number of impressions for Website A, where X is greater than Y or X is greater than Y by a particular threshold, then the data transformation application may select the category assigned by the data source 205A as the category of Website A. In other embodiments, the data transformation application 200 may decide the category based on other data attributes. In other embodiments, the data transformation application 200 may categorize based upon the most used category for Website A. For example, if Website A is classified as a news website by more data sources than as a sports website, the data transformation application 200 may determine the Website A is a news website and classify Website A as a news web site.

By re-categorizing Website A (either by assigning the category from the running list or assigning a new category), the data transformation application 200 ensures that Website A is always categorized in the same way regardless of how that website may have been categorized by the data sources 205A-205N. The re-categorization of a platform by the data transformation application 200 is discussed further in FIG. 3 below. Upon re-categorizing a platform, the data transformation application 200 saves the data associated with the platform as the persisted data 230, and makes the persisted data available to the users of the data transformation application for querying via the dashboard 210. The dashboard 210 is described in greater detail in FIGS. 5-12 below.

Figure 3:
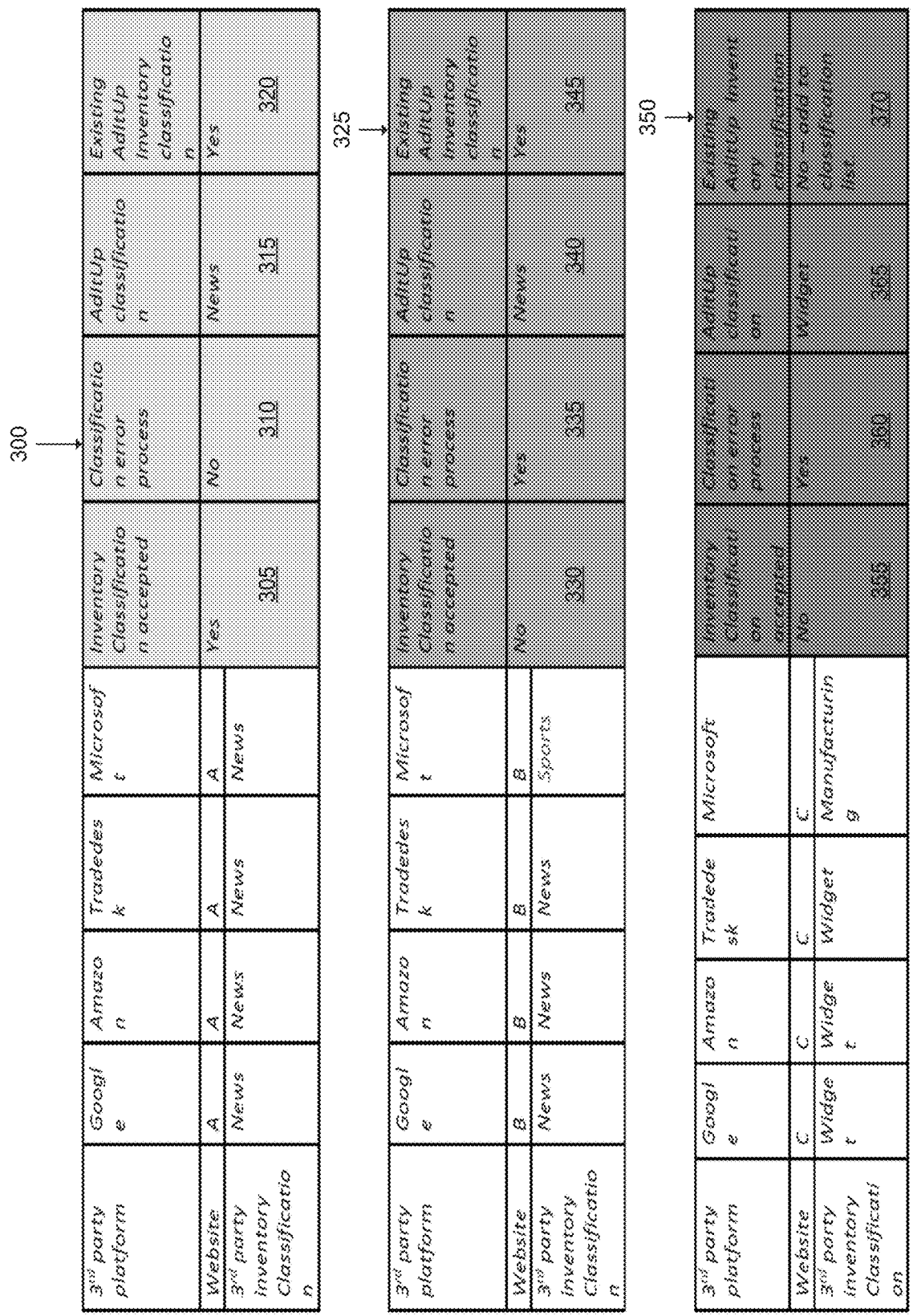
FIG. 3 is an example block diagram showing re-categorization of a platform by the data transformation application of FIG. 2, in accordance with some embodiments of the present disclosure.

Turning now to FIG. 3, an example of how the data transformation application 200 may re-categorize Website A whose data is received from multiple data sources is shown, in accordance with some embodiments of the present disclosure. It is to be understood that the example of FIG. 3 is not intended to be limiting in any way. The data sources that are used, as well as the number of data sources used in FIG. 3 are only examples. Further, although website A is used as an example, FIG. 3 is applicable to other platforms such as applications, services, etc. FIG. 3 shows a first example 300 in which web site A has been classified by Google, Amazon, TradeDesk, and Microsoft as a news website. The data transformation application 200 may determine whether Website A was previously categorized by the data transformation application. Thus, the data transformation application 200 may cross-reference the running list to determine if Website A is on the running list. As indicated in column 320, the data transformation application 200 determines that Website A was previously categorized. The data transformation application 200 also identifies the category assigned to Website A on the running list. As indicated in column 315, the data transformation application 200 previously assigned the category "news" to Website A. Since each of the data sources (e.g., Google, Amazon, TradeDesk, and Microsoft) have also assigned the category "news" to Website A, the data transformation application 200 may determine that no discrepancy in the category exists, and therefore, the categorization of Website A is acceptable, as noted in columns 305 and 310.

In example 325, the data transformation application 200 may again determine whether Website A was previously categorized. As indicated in column 345, Website A is on the running list, and as indicated in column 340, the data transformation application 200 previously assigned the category "news" to Website A. Further, the data transformation application 200 determines that a discrepancy in the categorization of Website A exists. Specifically, the data transformation application 200 may determine that Microsoft has categorized Website A as a sports website, while Google, Amazon, and TradeDesk have classified Website A as a news website. Since the categories assigned to Website A by Google, Amazon, and TradeDesk match the category previously assigned by the data transformation application 200, the category for Website A need not be changed for Google, Amazon, and TradeDesk. However, since the category assigned to Website A by Microsoft is different from the category assigned to Website A previously by the data transformation application 200, the data transformation application may determine that a discrepancy exists and that the category of Website A for Microsoft is not acceptable, as indicated in columns 330 and 335. The data transformation application 200 may change the category of Website A from "sports" to "news" since the data transformation application 200 previously categorized Website A as a news website. Therefore, the data transformation application 200 may re-categorize Website A in the data records received from Microsoft as a news website.

In example 350, the data transformation application 200 again determines that a discrepancy in the categorization of Website A exists. Specifically, the data transformation application 200 may determine that Microsoft categorized Website A as a manufacturing website, while Google, Amazon, and TradeDesk classified Website A as a widget website. Further, as indicated in column 370, the data transformation application 200 may determine that Website A has not been previously categorized by the data transformation application. In other words, Website A is not on the running list. Since Website A has not been categorized, the data transformation application 200 has not previously assigned a category to Website A. Thus, the data transformation application 200 determines that a discrepancy exists and the category of Website A is not acceptable, as indicated in columns 355 and 360. The data transformation application 200 may assign a category to Website A, and add Website A and the assigned category to the running list for future categorization.

To assign a category to Website A, in some embodiments, the data transformation application 200 may determine that majority of the data sources have categorized Website A as a "widget" website. Thus, the data transformation application 200 may categorize Website A as a "widget" website, as noted in column 365. Further, as indicated in column 370, the data transformation application 200 may add Website A and category "widget" to the running list. In other embodiments, the data transformation application 200 may use other criteria to categorize Website A.

Referring now to FIG. 4, an example of a persisted data 400 is shown, in accordance with some embodiments of the present disclosure. The persisted data 400 is obtained upon cleansing and re-categorizing the impression data 225. The persisted data 400 is analogous to the persisted data 230. The persisted data 400 may correspond to data received from one data source. In some embodiments, the persisted data 400 may be organized into rows and columns, with each row being directed to one advertisement displayed on a particular platform. If that particular platform provides multiple advertisements, one row may be provided for each advertisement. The columns may provide the relevant data attribute for each row. For example, in some embodiments, the columns may include a first column 405 to identify the platform on which the advertisement is displayed, a second column 410 to identify the number of impressions, a third column 415 to identify the CPM, a fourth column 420 to identify the category assigned by the data transformation application 200 to the platform identified in the first column, and a fifth column 425 to identify the placement or size of the advertisement displayed on the platform identified in the first column. In some embodiments, the persisted data 400 may include other or additional columns for other or additional data attributes.

Further, in some embodiments, the persisted data 400 may be organized by the data source. For example, in some embodiments, the persisted data 400 may represent the data received from one of the data sources 205A-205N. In other embodiments, the persisted data 400 may combine the data received from all of the data sources 205A-205N. The persisted data 400 may be saved within the repository 220 and made available to a user to query via the dashboard 210.

Figure 5:
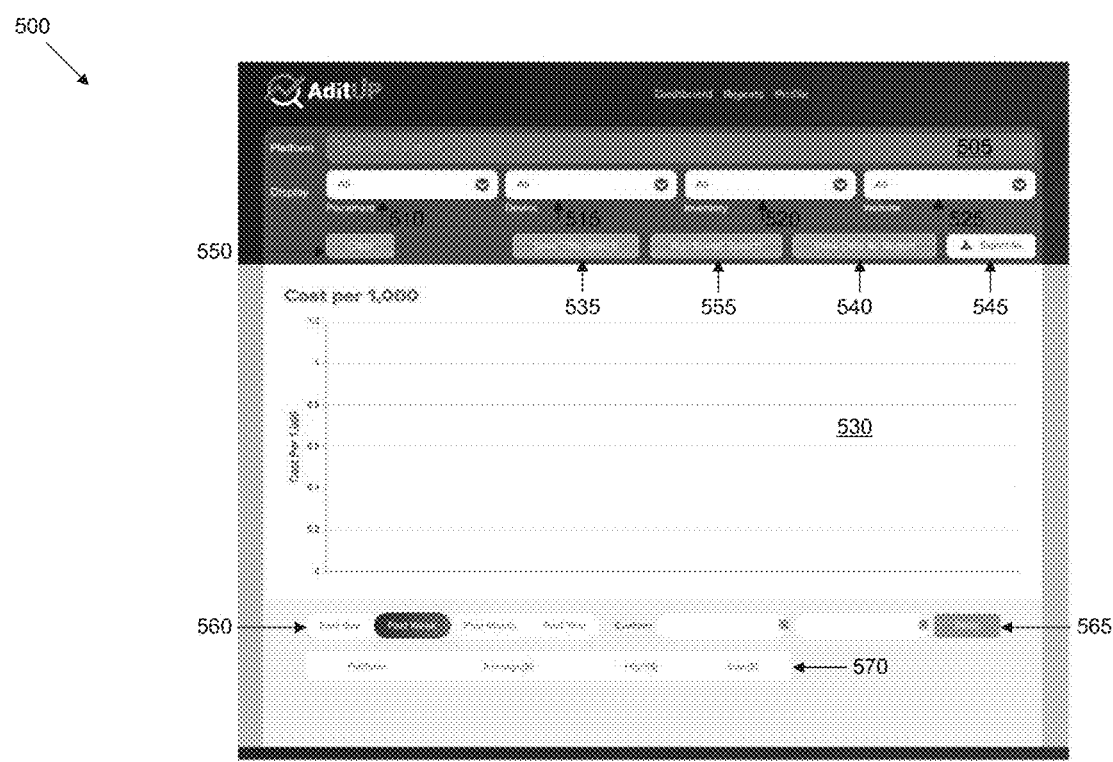
FIGS. 5-12 are examples of a dashboard associated with the data transformation application of FIG. 2, in accordance with some embodiments of the present disclosure.

Turning now to FIG. 5, an example dashboard 500 is shown, in accordance with some embodiments of the present disclosure. The dashboard 500 is analogous to the dashboard 210. The dashboard 500 may be used to receive input (e.g., via the input devices 115) from a user and provide output (e.g., via the output devices 120) to the user. The dashboard 500, thus, forms the front end of the data transformation application 200. The dashboard 500 may be used to access the data transformation application 200. The data transformation application 200 and the dashboard 500 may be available to the user in any of a variety of ways. In some embodiments, the data transformation application 200 and/or the dashboard 500 may be accessed via a dedicated computing device. In other embodiments, the data transformation application 200 and/or the dashboard 500 may be hosted on a cloud service and may be accessed through the cloud via a web or mobile application.

In some embodiments, the data transformation application 200 and/or the dashboard 500 may be accessed via an Application Programming Interface ("API"). To access the dashboard 210 via the API, a user may use designated devices such as laptops, desktops, tablets, mobile devices, other handheld or portable devices, and/or other types of computing devices that are configured to access the API. In some embodiments, these devices may be different from the computing device on which the data transformation application 200 is installed. In some embodiments, the user may access the data transformation application 200 and the dashboard 500 via a web browser, and upon entering a uniform resource locator ("URL") for the API such as the IP address of the data transformation application or other web address. In other embodiments, the data transformation application 200 and/or the dashboard 500 may be configured for access in other ways.

Further, upon accessing the data transformation application 200 and/or the dashboard 500, users may send instructions to the data transformation application and receive information back from the data transformation application. In some embodiments, an API may be used to send and receive data from the data transformation application 200. In some embodiments, the API that is used may be a representational state transfer ("REST") type of API. In other embodiments, the API may be any other type of web or other type of API (e.g., ASP.NET) built using any of a variety of technologies, such as Java, .Net, etc., that is suitable for facilitating communication between the data transformation application 200 and the users via the dashboard 500. In some embodiments, the API may be configured to facilitate communication via a hypertext transfer protocol ("HTTP") or hypertext transfer protocol secure ("HTTPS") type request. The API may receive an HTTP/HTTPS request and send an HTTP/HTTPS response back. In other embodiments, the API may be configured to facilitate communication using other or additional types of communication protocols.

The dashboard 500 provides a user interface that facilitates human-computer interaction between the users and the data transformation application 200. The dashboard 500 may be configured to receive user inputs from the users via a graphical user interface ("GUI") and transmit those user inputs to the data transformation application 200. The dashboard 500 is also configured to receive outputs/information from the data transformation application 200 and present those outputs/information to the users via the GUI of the dashboard. The GUI may present a variety of graphical icons, windows, visual indicators, menus, visual widgets, and other indicia to facilitate user interaction. In other embodiments, the dashboard 500 may be configured as other types of user interfaces, including for example, text-based user interfaces and other man-machine interfaces. Thus, the dashboard 500 may be configured in a variety of ways.

Further, the dashboard 500 may be configured to receive user inputs in a variety of ways. In some embodiments, the dashboard 500 may be configured to receive user inputs via the input devices 115. In other embodiments, the dashboard 500 may be configured to receive the user inputs in other ways. The dashboard 500 may also be configured to present outputs/information to the users in a variety of ways. In some embodiments, the dashboard 500 may present outputs to the user via the output devices 120. In other embodiments, the dashboard 500 may be configured to present the outputs in other ways. Generally speaking, the dashboard 500 may be associated with any type of hardware, software, and/or firmware component that enables the data transformation application 200 to perform the functions described herein.

Upon accessing the dashboard 500, the user may be presented with a home screen (e.g., the screen shown in FIG. 5). The home screen may include a variety of filters that the user may use to send a query to the data transformation application 200. The filters may be used to filter and limit the results that are received back from the data transformation application 200. For example, the home screen includes a platform field 505 that may be used to identify one or more of the data sources 205A-205N whose data the user desires to view. The user may also set a placement filter 510 to limit the size of the advertisement that the user wishes to view data for, a device filter 515 to limit the data to advertisements displayed on a particular device (e.g., web versus mobile), an inventory filter 520 to identify a category of the data, and a website filter 525 to identify a particular website or platform whose data is provided by the data source identified in the platform field 505. In some embodiments, one or more of the platform filter 505, the placement filter 510, the device filter 515, the inventory filter 520, and the website filter 525 may be provided as a drop down list from which the user may select one or multiple options. In other embodiments, one or more of the platform filter 505, the placement filter 510, the device filter 515, the inventory filter 520, and the website filter 525 may be provided in other ways.

Further, in some embodiments, the user is not required to set each of the platform filter 505, the placement filter 510, the device filter 515, the inventory filter 520, and the website filter 525. Rather, in some embodiments, the user may set one or more of the platform filter 505, the placement filter 510, the device filter 515, the inventory filter 520, and the website filter 525 based upon the filters that the user desires to apply to and filter the data. It is to be understood that the shape, size, placement, and other aspects of the fields for the platform filter 505, the placement filter 510, the device filter 515, the inventory filter 520, and the website filter 525 shown in FIG. 5 are only an example, and may vary in other embodiments.

As the user sets one or more of the platform filter 505, the placement filter 510, the device filter 515, the inventory filter 520, and the website filter 525, data that satisfies those filters may be displayed in a graphical form in a display window 530. In some embodiments, the display window 530 may be configured to plot the CPM data that satisfies the filters (e.g., the platform filter 505, the placement filter 510, the device filter 515, the inventory filter 520, and the website filter 525) that are set. Thus, the user may run a search query using one or more of the platform filter 505, the placement filter 510, the device filter 515, the inventory filter 520, and the website filter 525, and view the CPM data corresponding to the search query in the display window 530.

Additionally, the dashboard 500 provides the ability to the user to save the current search that is being run. For example, upon running a search, the user may interact with (e.g., click on) a "save this search" button 535 to save the search. The user may also view the CPM data being displayed within the display window 530 in a data view by interacting with (e.g., clicking on) a "view data as report" button 540. Further, the user may export the graph shown in the display window 530 into various file formats by using an "export as" button 545. In some embodiments, the user may clear the current search by interacting with (e.g., clicking on) a "clear" button 550. Further, in some embodiments, the user may run a previously executed and saved search by interacting with (e.g., clicking on) a "run saved search" button 555.

It is to be understood that the shape, size, placement, and other aspects of the "save this search" button 535, the "view data as report" button 540, the "export as" button 545, the "clear" button 550, and the "run saved search" button 555 may vary in other embodiments from that shown in FIG. 5. Further, although certain types of filters (e.g., the platform filter 505, the placement filter 510, the device filter 515, the inventory filter 520, and the website filter 525) and certain types of action buttons (e.g., the "save this search" button 535, the "view data as report" button 540, the "export as" button 545, the "clear" button 550, and the "run saved search" button 555) are shown and described herein, in other embodiments, the number and types of filters and action buttons may vary.

The home screen of the dashboard 500 may also include a time filter to provide additional information about the CPM data. For example, the home screen may also include a time tab 560 to identify the time period from which the CPM data is to be viewed. In some embodiments, the user may select to view CPM data from a "past day," "past week," "past month," and "past year." In some embodiments, the time tab 560 may include other granularities of time (e.g., "past minute," "past seconds," "past hours," etc.). In some embodiments, the user may select a custom time period by using a custom time tab 565. Based on the time period selected in the time tab 560 or the custom time tab 565, data corresponding to the time period selected may be displayed under a data tab 570. The data tab 570 may identify the CPM data from the data source selected in the platform filter 505 and compute an average of that data, and display the average under the "average" heading of the data tab 570. The data tab 570 may also identify the highest CPM value and the lowest CPM value in the CPM data from the data source in the selected time period, and display those values under the "high" and "low" headings, respectively, of the data tab.

The shape, size, placement, and other aspects of the time tab 560, the custom time tab 565, and the data tab 570 may vary in other embodiments from that shown. Thus, the home screen of the dashboard 500 may be used by a user to select one or more options, and view data satisfying the selected options. Further, although the CPM data is shown in the display window 530 and under the data tab 570, in other embodiments, other types of data that are considered relevant may be displayed in the display window and/or the data tab.

Figure 6:
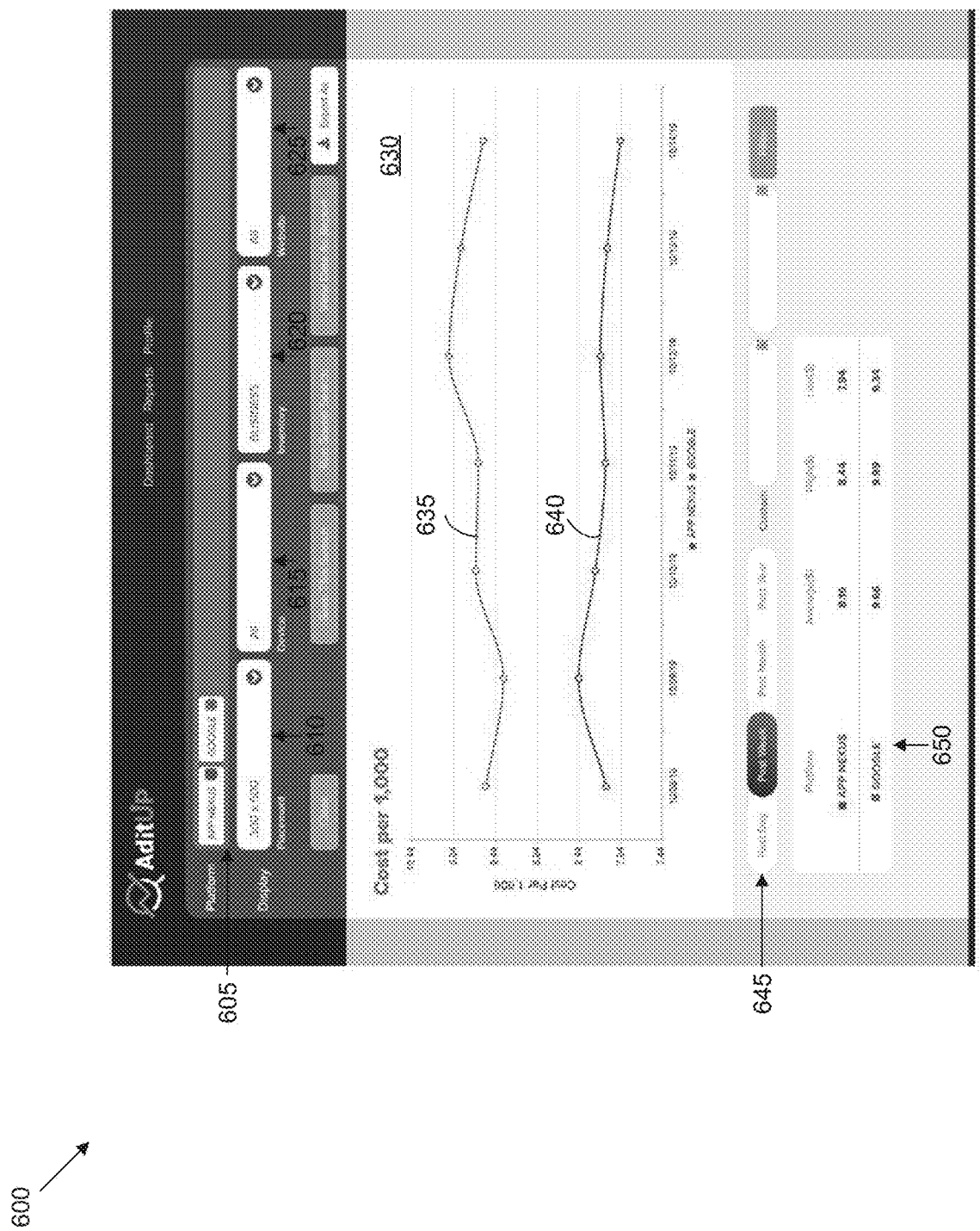

Referring to FIG. 6, an example dashboard 600 is shown, in accordance with some embodiments of the present disclosure. The dashboard 600 is similar to the dashboard 500. Thus, the dashboard 600 includes similar fields as the dashboard 500. For example, the dashboard 600 includes a platform filter 605, a placement filter 610, a device filter 615, an inventory filter 620, and a website filter 625, which are analogous to the platform filter 505, the placement filter 510, the device filter 515, the inventory filter 520, and the website filter 525, respectively. The dashboard 600 shows selection of certain filters by a user. For example, the user has selected two data sources, "App Nexus" and "Google" in the platform filter 605, an advertisement size of "300×600" in the placement filter 610, "all" devices in the device filter 615, a "business" category in the inventory filter 620, and "all" websites in the website filter 625.

The above filters are sent to the data transformation application 200, which then identifies data that satisfies those filters. For example, the data transformation application 200 identifies data from the "App Nexus" and "Google" data sources that have an advertisement size of "300×600" and are categorized under the "business" category regardless of the device on which the advertisement is presented and regardless of the website on which an advertisement appeared. The CPM data from the identified data is then displayed in a graphical form in a display window 630. Since the data transformation application 200 has re-categorized the platforms such that the platforms across various data sources are categorized uniformly, the data that is displayed in the displayed window 630 provides an accurate representation of the CPM data between the selected data sources. Thus, the display window 630 displays a first plot 635 corresponding to CPM data from "App Nexus" and a second plot 640 corresponding to CPM data from "Google." By displaying separate plots for the data sources, the display window 630 enables an easy and accurate comparison of the CPM data across multiple data sources.

The dashboard 600 also compiles CPM data for a selected time period. For example, the dashboard 600 shows that a user selected "past week" on a time tab 645 to view CPM data from the past week for "App Nexus" and "Google." The average, high, and low CPM data from "App Nexus" and "Google" may be displayed in a data tab 650. Thus, the dashboard 600 allows a user to view and compare CPM data from multiple data sources.

Figure 7:
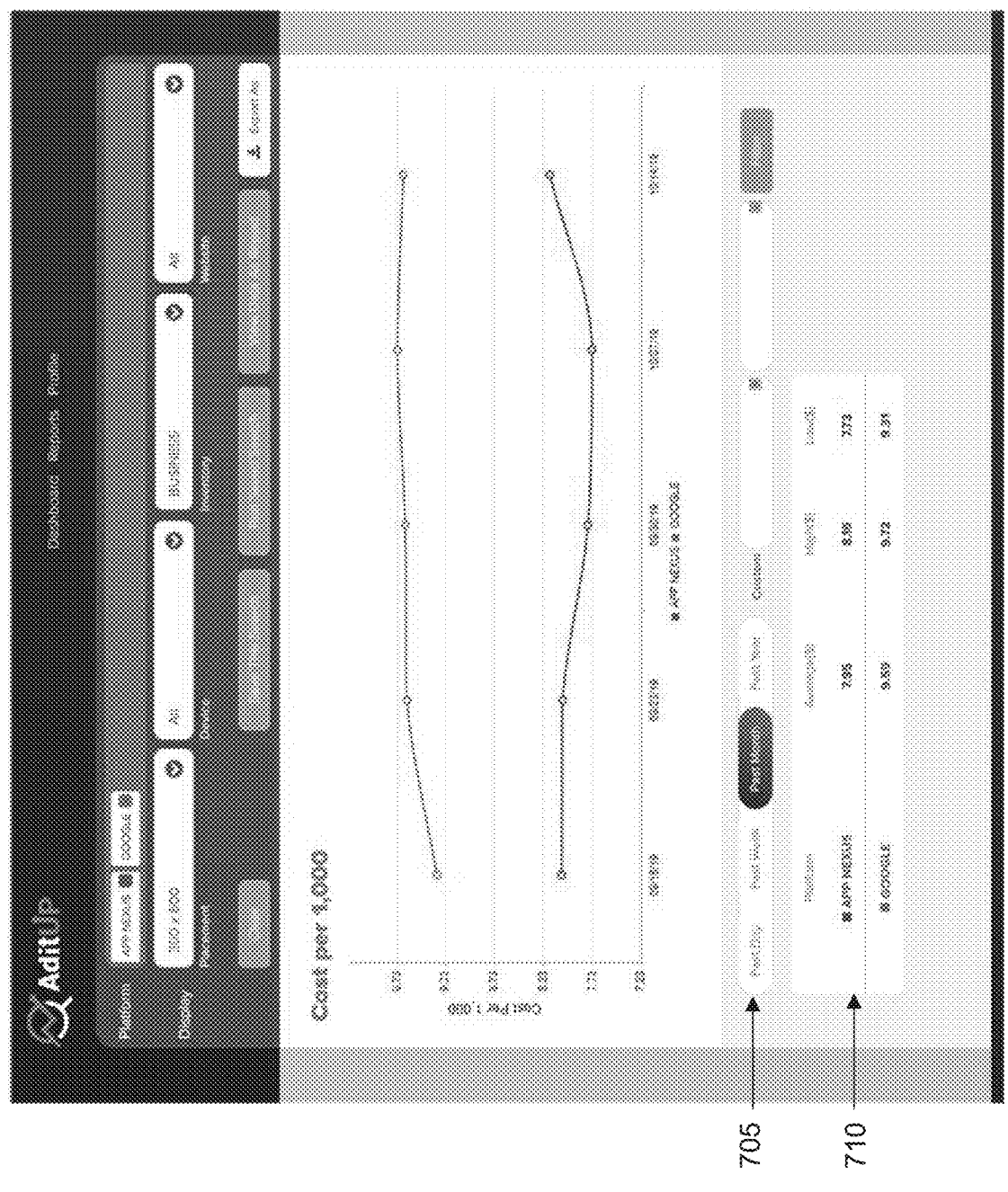
Figure 8:
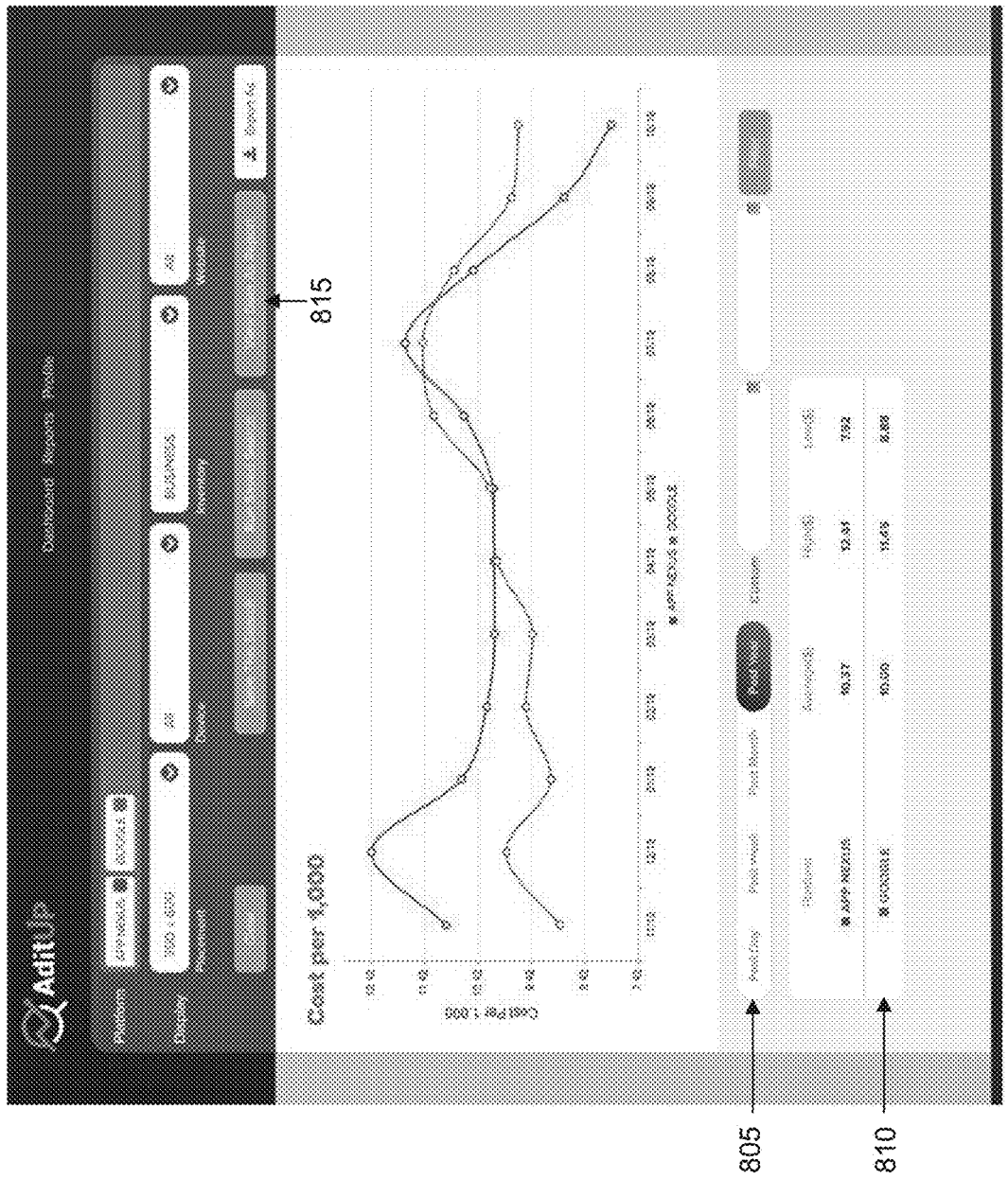

Turning to FIGS. 7 and 8, example dashboards 700 and 800, respectively, are shown, in accordance with some embodiments of the present disclosure. The dashboards 700 and 800 are similar to the dashboard 600 in that same filters are shown selected in the dashboards 700 and 800. The only difference in the dashboard 700 is that the option "past month" is selected on a time tab 705 to view CPM data from the past month in a data tab 710. Similarly, in the dashboard 800, the option "past year" is selected to view CPM data from the past year for "App Nexus" and "Google" in a data tab 810.

Figure 9:
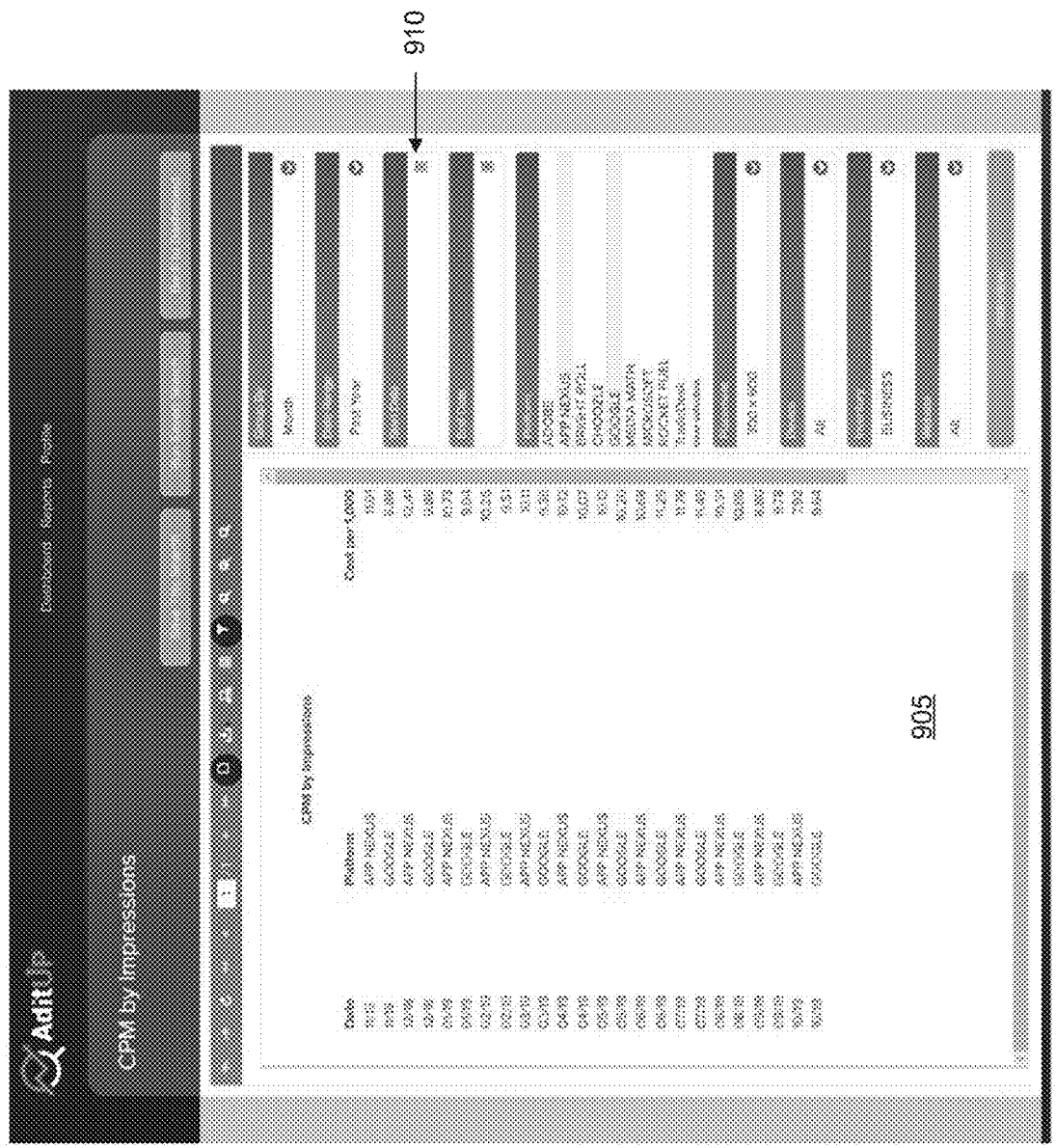

Referring now to FIG. 9, an example dashboard 900 is shown, in accordance with some embodiments of the present disclosure. The page shown in the dashboard 900 is reached by setting the filters set in the dashboard 800 and then clicking on "view data as report" button 815 to display the CPM data from the past year from "App Nexus" and "Google" in a tabular form in a window 905. The various filters that are set are displayed in a filter portion 910. The filters in the filter portion 910 may be changed at any point to dynamically change the data that is shown in the window 905.

Figure 10:
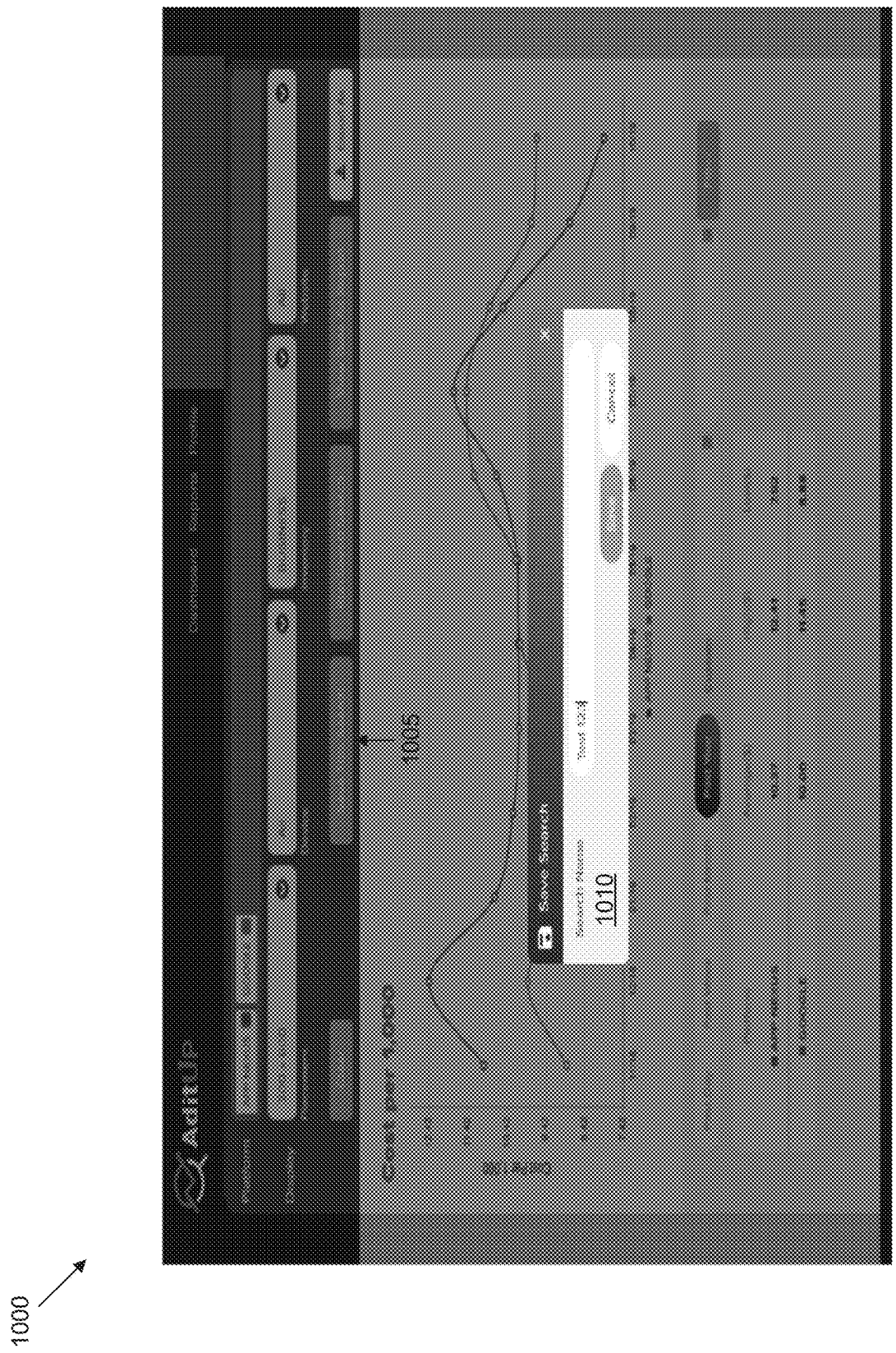
Figure 11:
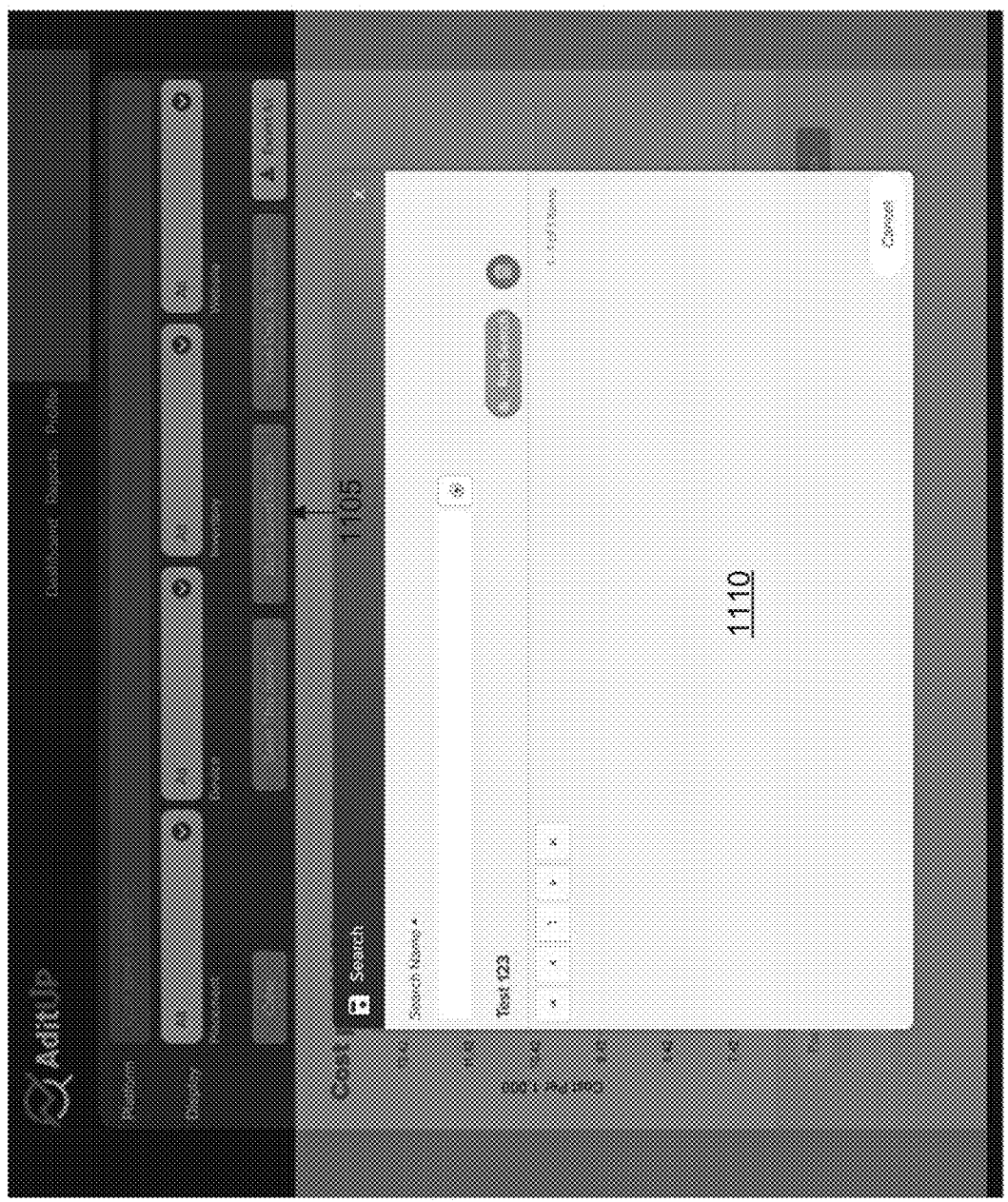

FIG. 10 shows an example of saving a search in a dashboard 1000. The dashboard 1000 is similar to the dashboards 500-800. Upon running a search query and receiving the search results, a user may save the search query and associated results for later reference by using a "save this search" button 1005. Upon interacting with (e.g., clicking on) the "save this search" button 1005, a dialog box 1010 may appear to allow the user to enter a name and save the search. The saved search may then later be used to rerun a search query, without having to set the individual filters again. For example, FIG. 11 shows an example dashboard 1100 in which the user may interact with (e.g., click on) a "run saved search" button 1105 to retrieve the search saved in the dashboard 1000. Upon interacting with the "run saved search" button 1105, a dialog box 1110 may appear to allow a user to select a search from a previously saved search.

Figure 12:
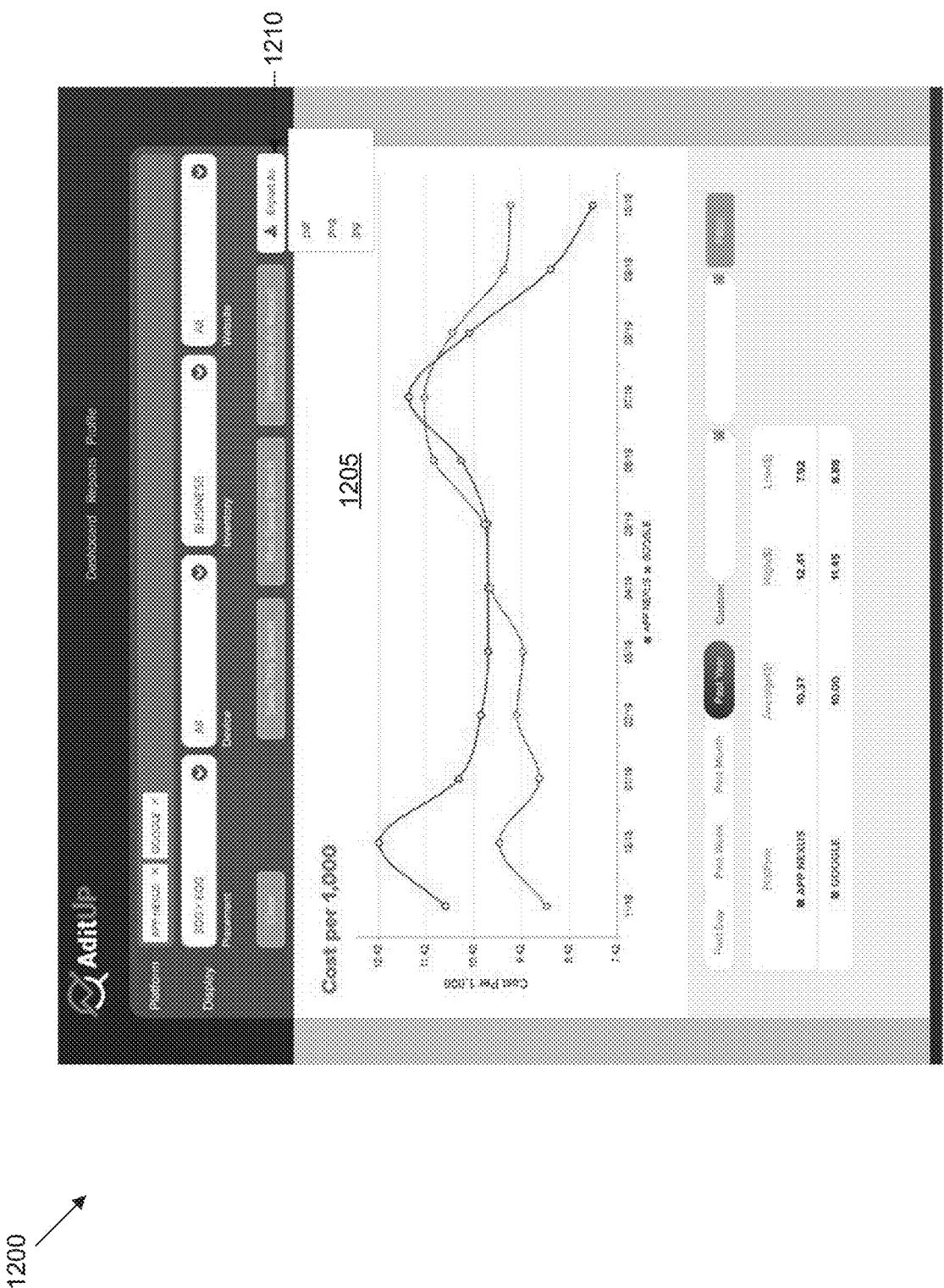

FIG. 12 shows an example dashboard 1200, which is similar to the dashboards 500-900. Upon running a search query and receiving the search results back, a user may export the plot shown in a display window 1205 using an "export as" button 1210. Upon interacting with (e.g., clicking on) the "export as" button 1210, a drop down list showing all available file formats in which the plot displayed in the display window 1205 may be exported to is shown. The user may select an option from the drop down list to export the plot shown in the display window 1205 into the selected file format.

Turning now to FIG. 13, an example flowchart outlining a process 1300 is shown, in accordance with some embodiments of the present disclosure. The process 1300 may include other or additional operations, depending upon the particular embodiment. The process 1300 may be implemented by a processing unit (e.g., the CPU cores 130A-130N) associated with the data transformation application 200. The process 1300 starts at an operation 1305 with receiving data from one or more of the data sources 205A-205N. The data received from the data sources 205A-205N is the impression data 225. When all of the impression data 225 that is to be processed is received, relevant data is extracted at operation 1310. The extracted data is then cleansed at operation 1315 to obtain cleansed data. From the cleansed data, at operation 1320, any discrepancies in the category of each platform whose data is received from multiple data sources is identified, and the discrepancy fixed by re-categorization, as discussed above, to obtain persisted data. At operation 1325, the persisted data is retrievably stored and made available to a user for querying via the dashboard 210. The process 1300 then ends at an operation 1330 waiting for the next batch of impression data.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A control processor can synthesize a model for an FPGA. For example, the control processor can synthesize a model for logical programmable gates to implement a tensor array and/or a pixel array. The control channel can synthesize a model to connect the tensor array and/or pixel array on an FPGA, a reconfigurable chip and/or die, and/or the like. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   receiving, by a processing unit associated with a data transformation application from a data source, advertising impression data;
   determining platform information based on the advertising impression data at least by:
     parsing a plurality of uniform resource locator (URL) strings from the advertising impression data, the plurality of URL strings comprising a first URL string, a second URL string, and a third URL string; and
     extracting, by the processing unit associated with the data transformation application, relevant data regarding each of the plurality of URL strings from the advertising impression data, the relevant data comprising a first set of relevant data corresponding to the first URL string, a second set of relevant data corresponding to the second URL string, and a third set of relevant data corresponding to the third URL string, the first set of relevant data, the second set of relevant data, and the third set of relevant data each comprising at least the platform information indicated by each of the first URL string, the second URL string, and the third URL string;
   parsing the relevant data for data labels identifying attribute categories regarding the relevant data and corresponding to values of the relevant data, the data labels comprising a first data label identifying a first attribute category;
   categorizing the relevant data according to one or more attributes, the one or more attributes comprising the first attribute category;
   cleansing the relevant data at least by:
     filtering the relevant data for incomplete relevant data, wherein filtering the relevant data for incomplete data comprises extracting the first URL string, a first value of the first set of relevant data, the second URL string, and a second value of the second set of URL data based on a determination that each of the first value and second value correspond to the first data label identifying the first attribute category;
     filtering the relevant data for duplicative relevant data, wherein filtering the relevant data for duplicative relevant data comprises extracting the first URL string and the first value based on a determination that the first URL string and the first value match the second URL string and the second value; and
     identifying the first URL string and the first value as cleansed data;
   converting, by the processing unit, the cleansed data into source-agnostic data, comprising re-categorizing at least some of the cleansed data based on the extracted platform information;
   retrievably storing, by the processing unit, the source-agnostic data as persisted data in a memory associated with the data transformation application;
   receiving, by the processing unit, a query via a dashboard associated with the data transformation application to retrieve the persisted data; and
   displaying, by the processing unit, a portion of the persisted data that satisfies the query on the dashboard.

2. The method of claim 1, further comprising extracting at least one of number of impressions related information, cost per thousand impressions related information, category related information, or placement related information from the advertising impression data.

3. The method of claim 1, wherein the re-categorizing of the cleansed data comprises:
   determining that a discrepancy exists between a second platform category assigned to a platform by the data source and a first platform category previously assigned to the platform by the processing unit of the data transformation application;
   changing a present category of the platform to the first platform category.

4. The method of claim 1, wherein the re-categorizing of the cleansed data comprises:
   determining that a platform is assigned a first platform category by a first data source and the platform is assigned a second platform category by a second data source, wherein the first platform category is different from the second platform category;
   determining that the processing unit of the data transformation application previously assigned the first platform category to the platform; and
   changing the second platform category assigned by the second data source to be the first platform category.

5. The method of claim 1, wherein the re-categorizing of the cleansed data comprises:
   determining that a platform is assigned a first platform category by a first data source and the platform is assigned a second platform category by a second data source and a third data source, wherein the first platform category is different from the second platform category;
   determining that the second platform category is assigned to the platform greater number of times than first platform category; and
   changing the first platform category assigned by the first data source to be the second platform category.

6. The method of claim 5, further comprising:
   determining, by the processing unit, that the second platform category has not been previously assigned to any platform; and
   adding, by the processing unit, the second platform category to a running list.

7. The method of claim 1, wherein the query comprises at least one query filter that is set by a user by which to filter the persisted data.

8. The method of claim 7, wherein the query filter comprises at least one of an indication of a platform, a device, a placement, or a data source.

9. The method of claim 1, wherein the portion of the persisted data that satisfies the filter query is displayed on the dashboard in a graphical format.

10. The method of claim 1, wherein the portion of the persisted data that satisfies the filter query is displayed in a tabular format.

11. The method of claim 1, wherein the filter query comprises a time period from which the portion of the persisted data is retrieved.

12. A non-transitory computer-readable media comprising computer-readable instructions retrievably stored thereon that when executed by a processing unit associated with a data transformation application causes the processing unit to:
receive advertising impression data;
based on the advertising impression data, determine platform information, comprising parsing a plurality of URL strings from the advertising impression data, the plurality of URL strings comprising a first URL string, a second URL string, and a third URL string;
extract relevant data regarding each of the plurality of URL strings from the advertising impression data received from a data source to obtain extracted data, the relevant data comprising a first set of relevant data corresponding to the first URL string, a second set of relevant data corresponding to the second URL string, and a third set of relevant data corresponding to the third URL string, the first set of relevant data, the second set of relevant data, and the third set of relevant data each comprising at least the platform information indicated by each of the first URL string, the second URL string, and the third URL string;
parse the relevant data for data labels identifying attribute categories regarding the relevant data and corresponding to values of the relevant data, the data labels comprising a first data label identifying a first attribute category;
categorize the relevant data according to the first attribute category;
cleanse the relevant data, at least by:
filtering the relevant data for incomplete relevant data, wherein filtering the relevant data for incomplete data comprises extracting the first URL string, a first value of the first set of relevant data, the second URL string, and a second value of the second set of URL data based on a determination that each of the first value and second value correspond to the first data label identifying the first attribute category;
filtering the relevant data for duplicative relevant data, wherein filtering the relevant data for duplicative relevant data comprises extracting the first URL string and the first value based on a determination that the first URL string and the first value match the second URL string and the second value; and
identifying the first URL string and the first value as cleansed data;
convert the cleansed data into source-agnostic data, comprising re-categorizing at least some of the cleansed data;
retrievably store the source-agnostic data as persisted data into a memory associated with the data transformation application;
receive a query via a dashboard associated with the data transformation application to retrieve the persisted data; and
display a portion of the persisted data that satisfies the query on the dashboard.

13. The non-transitory computer-readable media of claim 12, wherein the processing unit further comprises computer-readable instructions to:
determine that a discrepancy exists between a second platform category assigned to a platform by the data source and a first platform category previously assigned to the platform by the processing unit of the data transformation application; and
change a present category of the platform to the first platform category.

14. The non-transitory computer-readable media of claim 12, wherein the processing unit further comprises computer-readable instructions to:
determine that a platform is assigned a first platform category by a first data source and the platform is assigned a second platform category by a second data source, wherein the first platform category is different from the second platform category;
determine that the processing unit of the data transformation application previously assigned the first platform category to the platform; and
change the second category assigned by the second data source to be the first platform category.

15. The non-transitory computer-readable media of claim 12, wherein the processing unit further comprises computer-readable instructions to:
determine that a platform is assigned a first platform category by a first data source and the platform is assigned a second platform category by a second data source and a third data source, wherein the first platform category is different from the second category;
determine that the second platform category is assigned to the platform a greater number of times than first platform category; and
change the first platform category assigned by the first data source to be the second platform category.

16. The non-transitory computer-readable media of claim 15, wherein the processing unit further comprises computer-readable instructions to:
determine that the second platform category has not been previously assigned to any platform; and
add the second platform category to a running list.

17. The non-transitory computer-readable media of claim 12, wherein the dashboard comprises a plurality of query filter fields to set at least one query filter for the query, a plurality of action fields to select how to display the portion of the persisted data that satisfies the query on the dashboard, and a display window to display the portion of the persisted data that satisfies the query.

18. The non-transitory computer-readable media of claim 12, wherein the portion of the persisted data that satisfies the query is displayed in a graphical format or a tabular format.

19. A system comprising:
a data transformation application comprising:
a repository;
a processing unit structured to:
receive advertising impression data;
based on the advertising impression data, determine platform information, comprising parsing a plurality of URL strings from the advertising impression data, the plurality of URL strings comprising a first URL string, a second URL string, and a third URL string;
extract relevant data regarding each of the plurality of URL strings from the advertising impression data received from a data source to obtain extracted data, the relevant data comprising a first set of relevant data corresponding to the first URL string, a second set of relevant data corresponding to the second URL string, and a third set of relevant data corresponding to the third URL string, the first set of relevant data, the second set of relevant data, and the third set of relevant data each comprising at least the platform information indicated by each of the first URL string, the second URL string, and the third URL string;

parse the relevant data for data labels identifying attribute categories regarding the relevant data and corresponding to values of the relevant data, the data labels comprising a first data label identifying a first attribute category;

categorize the relevant data according to the first attribute;

cleanse the relevant data, at least by:
    filtering the relevant data for incomplete relevant data, wherein filtering the relevant data for incomplete data comprises extracting the first URL string, a first value of the first set of relevant data, the second URL string, and a second value of the second set of URL data based on a determination that each of the first value and second value correspond to the first data label identifying the first attribute category;
    filtering the relevant data for duplicative relevant data, wherein filtering the relevant data for duplicative relevant data comprises extracting the first URL string and the first value based on a determination that the first URL string and the first value match the second URL string and the second value; and
    identifying the first URL string and the first value as cleansed data;

convert the cleansed data into source-agnostic data, comprising re-categorizing at least some of the cleansed data; and retrievably store the source-agnostic data as persisted data into the repository; and a dashboard to:
    receive a query to retrieve the persisted data; and
    display a portion of the persisted data that satisfies the query.

20. The system of claim 19, wherein the dashboard displays a first graph for the portion of the persisted data that satisfies the query from a first data source and a second graph for the portion of the persisted data that satisfies the query from a second data source.

* * * * *